Sept. 15, 1931.  W. T. JAMES  1,823,325
STEERING MECHANISM
Filed Dec. 8, 1927  2 Sheets-Sheet 1
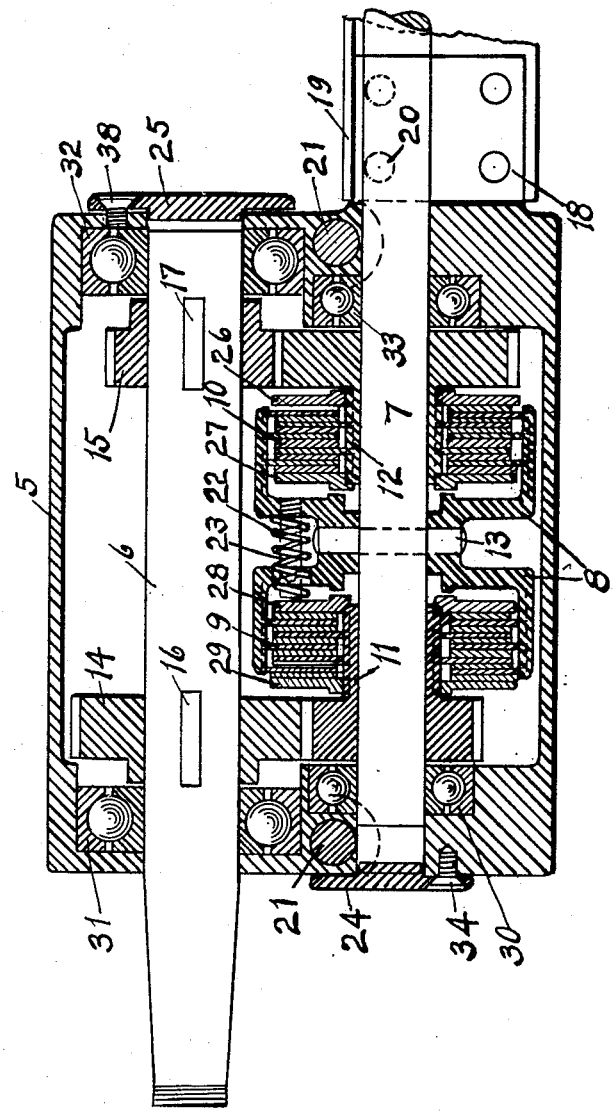
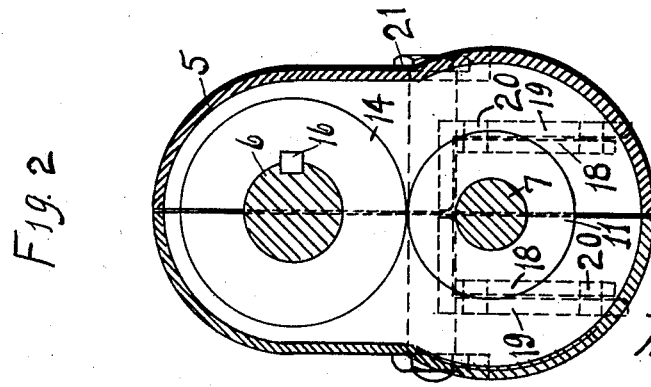
INVENTOR
William T. James Sept. 15, 1931.  W. T. JAMES  1,823,325
STEERING MECHANISM
Filed Dec. 8, 1927  2 Sheets-Sheet 2
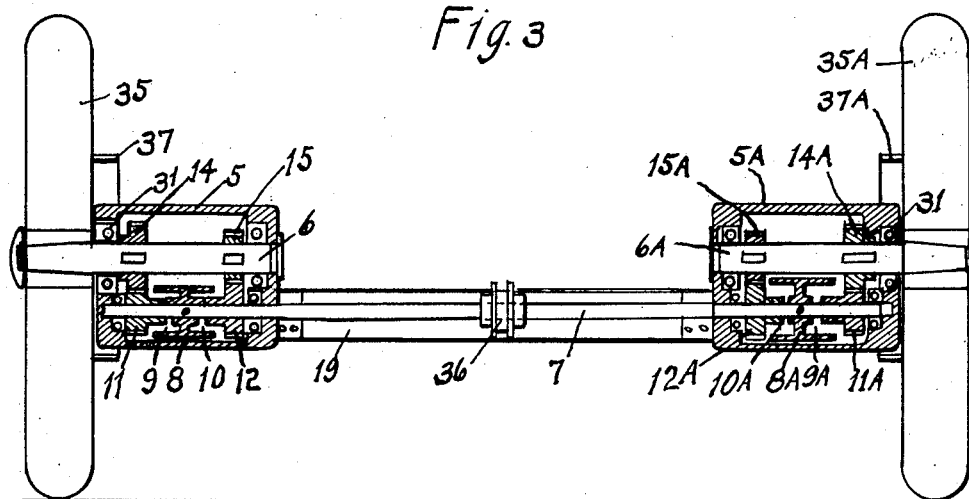
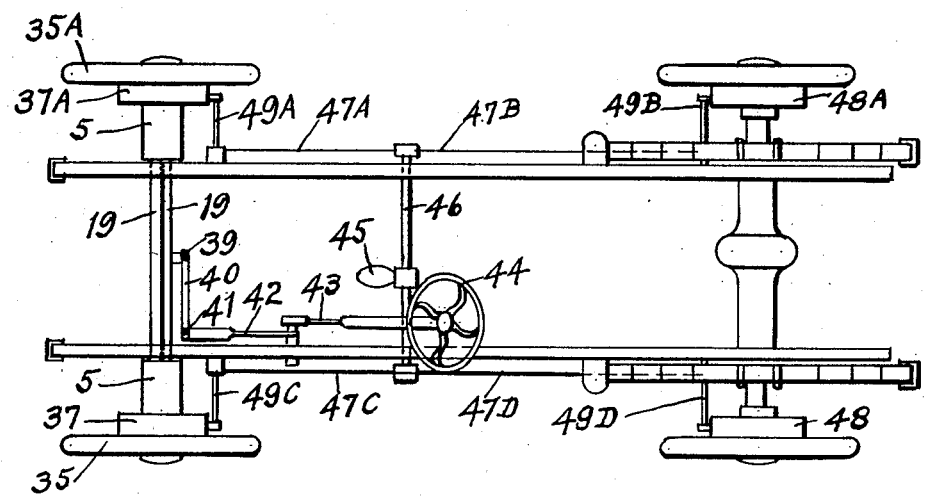
INVENTOR
William T. James Patented Sept. 15, 1931

1,823,325

UNITED STATES PATENT OFFICE

WILLIAM T. JAMES, OF CHICAGO, ILLINOIS

STEERING MECHANISM

Application filed December 8, 1927. Serial No. 238,692.

My present invention relates in general to speed changing gearing for the transmission of power from one shaft to another and more particularly described as speed changing gearing of type for use in automotive vehicles of which the following is a specification, reference being had therein to the accompanying drawings.

The principal object of my present invention is the provision of improved means for steering automotive vehicles having two drive wheels at one end of the vehicle usually designated as the steering wheels, and by utilizing the power derived from the tractive effort of one wheel as a drive wheel to revolve the other wheel at an accelerated speed or a decelerated speed by an assembly of shafts and gears with clutches to produce a change of speed and to change the direction of travel of the driven vehicle, by the change of speed of the other wheel as the driven wheel. The gears and clutches being in enclosed housing supports adjacent to each drive and driven wheel and each drive and driven wheel having the provision of improved brake mechanism for automotive steering wheels, whereby the parts may operate with a minimum loss of power by friction. The provision of means whereby the two driven wheels are mutually supported in alignment with a uniform braking pressure around the driven wheels as drive and driven members, and generally to improve, simplify, stabilize and economize on the construction of steering devices, together with such further objects as will hereinafter appear.

In attaining the foregoing objects and certain additional advantages to be below disclosed, I have provided the construction illustrated in the accompanying drawings wherein:—

Figure 1 is a longitudinal section through one enclosed set of gears and double clutch housing support with wheel axle shaft for the front end of an automotive vehicle, having flanges at one end for beam connections extended between the housings at each wheel to retain the housings in fixed alignment with each other, and showing the drive members and the driven members in cross section on their shafts.

Figure 2 is a cross section through the housing and shafts at gears 11 and 14, showing pitch line diameters of gears only.

Figure 3 is a cross section through the steering gear housings in position on a pair of vehicle wheels with shaft 7 and operating clutch collar ring 36, and brake rings 37 and 37A.

Figure 4 is a plan view of an automotive vehicle showing the assembly of gear housings, steering wheel with connections to shaft 7, brake wheels with straight line brake rods from foot pedal, and general assembly of vehicle with four wheels arranged in fixed alignment with each other.

Referring to the drawings, the gearing and clutches are contained in housings 5 and 5A, having rigid connecting supports between them and a connecting shaft with operating ring collar shifter to engage the clutches in each housing simultaneously when operatively connected to the steering wheel.

The housing 5 is shown as if made in halves to facilitate assembly of the parts; it may be made in any suitable manner or number of parts desired. 6 and 6A are axle shafts made in duplicate and designated by two numbers for convenience in reference. All parts marked "A" are duplicates of like parts with like numbers. 6 and 6A are the axle shafts for wheels 35 and 35A. 7 is a countershaft, movable endwise, with double clutch members 8 and 8A having grooves or ribs inside the ends for clutch discs to engage clutch discs 9 and 9A, 10 and 10A. 11 and 11A and 12 and 12A are pinions and gears respectively and revolubly mounted on shaft 7 and each having extended clutch hubs with grooves for clutch discs 9 and 9A and 10 and 10A. 13 is a pin to hold clutch member 8 on shaft 7 and clutch member 8A may be similarly held on shaft 7. 14 and 14A and 15 and 15A are gears and pinions respectively, keyed on axle shafts 6 and 6A by keys 16 and 17. 18 are flange projections on housings 5 and 5A to connect 5 and 5A in fixed relation to each other by angles 19. 20 are holes for bolts to connect 18 and 19. 21 are bolts through 5 and 5A to hold the halves of housing together. 30, 31, 32, and 33 are ball bearings. 22 is a coil spring and 23 is a pin in 22 to hold the spring in position in clutch member 8 with similar parts for 8A. 24 and 25 are caps to close shaft openings in 5 and 5A. 26, 27, 28, and 29 are clutch end rings or flanges to engage clutch discs. 34 and 38 are countersunk bolts to hold caps 24 and 25 in place. 35 and 35A are vehicle wheels with brake rings. 36 is a shifter ring collar on shaft 7. 37 and 37A are brake rings or brake wheels attached to 35 and 35A. 39 is a yoke on shifter 36. 40, 41, 42, and 43 are connecting members to steering wheel 44 to operate shifter collar 36. 45 is a pedal on shaft 46 to operate brake bands on brake wheels 37 and 37A and 48 and 48A. 47A, 47B, 47C, 47D and 49A, 49B, 49C, and 49D are connecting members between 37, 37A, 48 and 48A with shaft 46. It will be seen that the shaft 7 may be located in any parallel relation around the axles 6 and 6A, and the housings 5 and 5A may be located accordingly.

The housings 5 and 5A are provided with ball bearings to support the axle shafts and connecting shaft with gears and double clutches for engaging alternately the large and small gears to drive one of the wheels faster than the other and to change the direction of travel of the vehicle to the right or to the left by revolving 35 faster than 35A or vice versa. The gears 12 and 12A, and the pinions 11 and 11A have projected hubs with grooves or splines fitted with clutch discs in either side of double clutch members 8 and 8A pinned on shaft 7. The pinions 11 and 11A and gears 12 and 12A mesh with the gears 14 and 14A and the pinions 15 and 15A respectively keyed on shafts 6 and 6A.

Referring now to the gearing itself the construction and operation will be described as if the shaft 6A were the driving member and shaft 6 the driven member. The relationship may be reversed in operation. The drive shaft 6A is rigidly attached to the driven wheel 35A which revolves 6A on which gear 14A is held by key 17. When shaft 7 is moved to the right it engages clutch 9A with pinion 11A and clutch 10 with gear 12, revolving shaft 7 and driving pinion 15 keyed on shaft 6 attached to driven wheel 35 thereby revolving wheel 35 faster than wheel 35A according to the ratio of driving gears to driven pinions and diverting the course of the vehicle by turning to the right in a circular curve on a plane surface; the wheel 35 forming the outside circle of the curve and the wheel 35A the inside circle of the curve. When the shaft 7 is moved to the left the opposite combination of gears of the same ratios are engaged and the shaft 6 and wheel 35 become the driving members, then the shaft 6A with wheel 35A will revolve at a faster rate of speed than wheel 35 turning to the left and diverting the course of the vehicle in a circular curve on a plane surface in the opposite direction, the wheel 35A forming the outside circle of the curve and the wheel 35 the inside circle of the curve. The shaft 7 is provided with a shifter ring collar located between the two clutch and gear housings with rod connections to the steering wheel to shift it to the right or to the left by a short travel revolubly of the steering wheel. The wheels 35 and 35A are provided with brake bands on 37 and 37A and brake rod connections to operate simultaneously with brakes 48 and 48A from cross shaft 46 by pedal 45.

Having thus described my invention and illustrated its use, what I claim as new and desire to secure by Letters Patent is:

1. A steering mechanism having two wheels each mounted on separate shafts alternately operative as drive and driven shafts, to revolve the said wheels at different speeds, each shaft on each of said wheels having two gears keyed thereon, a countershaft connecting the said wheel shafts with revolubly mounted driving clutches having clutch drive gears thereon in mesh with the said gears on the said wheel shafts, the said clutch members being adapted to operatively engage the said gears on the said wheel shafts, simultaneously, at separate points on the said countershaft.

2. A steering mechanism having two wheels mounted on separate shafts with separate shaft supports adjacent to each of the said wheels, each of the said wheels alternately operative, at different speeds, as drive and driven wheels, each of the said wheel shafts having gears keyed thereon, a countershaft connecting the said wheel shafts extended into each of the separate shaft supports having revolubly mounted clutches with gears thereon meshing with the said gears on the said wheel shafts, the said clutch members being adapted to operatively engage two of the said clutch driven gear members simultaneously at separate points on the said countershaft.

3. A steering mechanism having two wheels each mounted on separate shafts in separate supports rigidly held together in fixed relation to each other, the said shafts alternately operative, in relation to each other, as drive and driven shafts and each shaft having two gears thereon having different diameters on each shaft, a countershaft connecting the said wheel shafts extended into each of the said separate wheel shaft supports having two revolubly mounted clutches with two gears thereon in each of the said separate shaft supports meshing with each pair of gears on each of the said wheel shafts, the said clutch members being adapted to operatively engage one pair of meshed gears in each of the said supports simultaneously to revolve one of the said wheels faster than the other of the said wheels and the said countershaft being shiftable longitudinally to disengage the said one pair of meshed gears on each of the said wheel shafts and to engage the other pair of meshed gears in each of the said supports simultaneously to revolve one of said wheels faster than the other of said wheels, the slower revolving wheel being the drive wheel and the faster revolving wheel being the driven wheel in each of the said two gear engagements.

4. A steering mechanism having two wheels each mounted on separate shafts in separate supports rigidly held together in fixed relation to each other, the said shafts alternately operative at different speeds and each shaft having two gears thereon of different diameters, a countershaft connecting the said wheel shafts extended into each of the said separate shaft supports having two revolubly mounted clutches with two gears thereon in each of the said separate shaft supports meshing with each pair of gears on each of the said wheel shafts, the said clutch members being adapted to operatively engage one pair of meshed gears in each of the said supports simultaneously to revolve one of the said wheels faster than the other of the said wheels and the said countershaft being shiftable longitudinally to disengage the said one pair of meshed gears on each of the said wheel shafts and to engage the other pair of said meshed gears in each of the said supports simultaneously to alternatively revolve the said faster wheel slower than the other said wheel, the slower revolving wheel being a drive wheel and the faster revolving wheel being a driven wheel alternated by the change in clutch gear engagements, and a shifter connection on the said countershaft having means adapted to operate the said clutches from a revoluble handwheel.

5. A steering mechanism on a vehicle having two wheels mounted on separate shafts in separate supports rigidly held in fixed relation to each other, the said shafts alternately operative to revolve the said wheels at different speeds and each of the said wheel shafts having two gears thereon of different diameters, a countershaft connecting the said wheel shafts extended into each of the said separate shaft supports having two revolubly mounted clutches with two gears of different diameters thereon in each of the said separate shaft supports meshing with each of the said pairs of gears on each of the said wheel shafts, the said clutch members being adapted to operatively engage one pair of meshed gears in each of the said supports simultaneously to revolve one of the said vehicle wheels faster than the other of the said vehicle wheels and the said countershaft being shiftable longitudinally to revolve either of the said vehicle wheels faster than the other of the said vehicle wheels by means connected to a revoluble handwheel on the said vehicle.

6. A steering mechanism on a vehicle having two wheels with circular flanges projected on one side of each wheel and each wheel mounted on separate shafts in separate supports rigidly held in fixed relation to each other, the said shafts alternately operative to revolve the said flanged wheels at different speeds and each of the said wheel shafts having two gears thereon of different diameters, a countershaft connecting the said wheel shafts extended into each of the said separate shaft supports having two revolubly mounted clutches with two gears of different diameters thereon in each of the said separate shaft supports meshing with each of the said pairs of gears on each of the said wheel shafts, and means for shifting the said countershaft longitudinally from a revoluble handwheel on the said vehicle to engage one pair of meshed gears in each of the said separate shaft supports simultaneously to revolve one of the said vehicle wheels at a different speed from the other of the said vehicle wheels.

WILLIAM T. JAMES.